(12) United States Patent
Egami

(10) Patent No.: US 11,838,257 B2
(45) Date of Patent: Dec. 5, 2023

(54) IDENTIFYING AND HANDLING BROADCAST ELECTRONIC MAIL

(71) Applicant: NEC Corporation, Tokyo (JP)

(72) Inventor: Kenichi Egami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/787,655

(22) PCT Filed: Nov. 18, 2020

(86) PCT No.: PCT/JP2020/042921
§ 371 (c)(1),
(2) Date: Jun. 21, 2022

(87) PCT Pub. No.: WO2021/131412
PCT Pub. Date: Jul. 1, 2021

(65) Prior Publication Data
US 2022/0417199 A1     Dec. 29, 2022

(30) Foreign Application Priority Data

Dec. 27, 2019   (JP) .................................. 2019-237850

(51) Int. Cl.
*H04L 51/42*        (2022.01)
(52) U.S. Cl.
CPC .................................. *H04L 51/42* (2022.05)
(58) Field of Classification Search
CPC ....................................................... H04L 51/42
USPC ........................................................ 709/206
See application file for complete search history.

(56) References Cited

FOREIGN PATENT DOCUMENTS

| JP | 2013-219480 A |   | 10/2013 |
|----|---------------|---|---------|
| JP | 2013219480 A  | * | 10/2013 |
| JP | 2018-107486 A |   | 7/2018  |
| JP | 2018107486 A  | * | 7/2018  |

OTHER PUBLICATIONS

International Search Report for PCT Application No. PCT/JP2020/042921, dated Feb. 22, 2021.
English translation of Written opinion for PCT Application No. PCT/JP2020/042921, dated Feb. 22, 2021.

* cited by examiner

*Primary Examiner* — James E Springer

(57) ABSTRACT

The information processing device comprises: a broadcast mail determination means which determines a broadcast mail among received electronic mails; a broadcast mail reception predicted time limit setting means which, when the previously received electronic mail is determined as the broadcast mail, sets a predicted time limit for receiving a broadcast mail on the basis of the difference between the reception time of the previously received electronic mail and the reception time of the electronic mail determined as the broadcast mail; and a broadcast mail reception standby end determination means which determines whether to end reception standby of the broadcast mail on the basis of the predicted time limit for receiving the broadcast mail, which is set by the broadcast mail reception predicted time limit setting means.

17 Claims, 6 Drawing Sheets

Fig. 3

| E-MAIL ID | RECEPTION DATE AND TIME | BROADCAST MAIL DETERMINATION Hash VALUE | To ADDRESS | Cc ADDRESS | Envelope-To ADDRESS | BROADCAST MAIL DETERMINA-TION | BROADCAST MAIL RECEPTION PREDICTED TIME LIMIT | REMAINING ADDRESS | END DETERMINA-TION |
|---|---|---|---|---|---|---|---|---|---|
| 1101 | 2019/08/30 17:06:20 | c59548c3c576228486 a1f0037eb16a1b | A001@domain, A002@domain, A003@domain | NONE | A001@domain | 1101 | 2019/08/30 17:07:50 | A002@domain, A003@domain | |
| 1102 | 2019/08/30 17:06:21 | 10f41a7e31807cd877 cfc286e70478df | B001@domain | NONE | B001@domain | 1102 | 2019/08/30 17:07:51 | NONE | END |
| 1103 | 2019/08/30 17:06:25 | 0b645bc0a904876f0e 89464cab4c552d | C001@domain | C002@domain, C003@domain, C004@domain | C001@domain, C002@domain | 1103 | 2019/08/30 17:07:55 | C003@domain, C004@domain | |
| 1104 | 2019/08/30 17:06:32 | c59548c3c576228486 a1f0037eb16a1b | A001@domain, A002@domain, A003@domain | | A002@domain | 1101 | 2019/08/30 17:06:56 | A003@domain | |
| 1105 | 2019/08/30 17:06:52 | c59548c3c576228486 a1f0037eb16a1b | A001@domain, A002@domain, A003@domain | | A003@domain | 1101 | 2019/08/30 17:07:32 | NONE | END |
| 1106 | 2019/08/30 17:07:05 | 0b645bc0a904876f0e 89464cab4c552d | C001@domain | C002@domain, C003@domain, C004@domain | C003@domain | 1103 | 2019/08/30 17:08:25 | C004@domain | END |
| 1107 | 2019/08/30 17:08:50 | 6de9439834c9147569 741d3c9c9fc010 | D001@domain | D002@domain | D001@domain | 1107 | 2019/08/30 17:10:20 | D002@domain | |

IDENTIFYING AND HANDLING BROADCAST ELECTRONIC MAIL

This application is a National Stage Entry of PCT/JP2020/042921 filed on Nov. 18, 2020, which claims priority from Japanese Patent Application 2019-237850 filed on Dec. 27, 2019, the contents of all of which are incorporated herein by reference, in their entirety.

TECHNICAL FIELD

The present invention relates to an information processing device, and particularly relates to control of transmission of electronic mail.

BACKGROUND ART

In recent years, electronic mail has to be widely used. In order to prevent erroneous transmission of an electronic mail or the like, a server device for performing transmission control of electronic mail data may be provided. In this server device, it is known that items such as destinations of electronic mails and combinations thereof, keywords included in a title or a body of electronic mail, and content of attached files can be set as conditions, and a rule for performing relay control of the electronic mail be set by combining these conditions, and control of transmission of the electronic mail be performed according to the rule.

In some electronic mail servers and electronic mail clients, in a case where electronic mails are sent to a plurality of destinations, an individual envelope is created for each destination and the electronic mails are separately sent. When the envelope information is created in this form, in a case where a combination of destinations is set as a condition of a transmission control rule, there is a possibility that the transmission control intended by the system administrator who created the rule will not be performed. This is because, if an envelope is created separately for each destination, all the destinations set in the electronic mail may not be set in an envelope. In order to solve such an issue, it has been proposed that a server device perform transmission control by combining electronic mails created for each destination and applying a rule.

Patent Literature 1 (PTL1) relates to an e-mail system, and it is proposed to process a plurality of broadcast mails with different envelope destinations in a unified manner in a case where the same sender delivers electronic mails of the same content specifying a plurality of destinations.

Patent Literature 2 (PTL2) relates to transmission control of an electronic mail, and it is proposed that transmission control of an electronic mail can be performed using envelope information before destination division even in an electronic mail system in which an envelope is generated for each destination. PTL2 proposes integrating envelope information if the reception time of received electronic mail data and the reception time of another electronic mail are within the combination standby time.

CITATION LIST

Patent Literature

[PTL1] Japanese Patent Application Laid-Open No. 2013-219480 (JP 2013-219480A)
[PTL2] Japanese Patent Application Laid-Open No. 2018-107486 (JP 2018-107486A)

SUMMARY OF INVENTION

Technical Problem

However, the electronic mail transmission control of the background art described above has the following issues.

In a case where the same sender delivers an electronic mail of the same content designating a plurality of destinations, it is necessary to first determine which electronic mails are the same when a plurality of broadcast mails having different envelope destination generated by division are delivered to an External Mail Transfer Agent (MTA) by one delivery process.

Furthermore, in order to perform transmission control by combining electronic mails for which envelopes have been separately created for each destination and applying a rule, it is necessary to wait for a plurality of broadcast mails with different envelope destinations to be prepared. The longer the waiting time, the higher the accuracy of restoration from a plurality of broadcast mails with different envelope destinations to an electronic mail with the same content in which the same sender designates a plurality of destinations, but the delay time (delivery delay time) until the electronic mail is actually transmitted increases.

PTL2 proposes integrating envelope information based on a reception time and a combined standby time of electronic mails and updating the combining standby time. However, in order to achieve appropriate integration of envelope information, it is necessary to integrate the envelope information after standby during the elapse of the combining standby time. For this reason, the above-described issue that the delay time (delivery delay time) until the electronic mail is actually transmitted increases cannot be solved.

Therefore, it is an object of the present invention to provide an information processing device which can combine electronic mails, the envelopes of which have been created for respective destinations, and control transmission by applying a rule thereto, without increasing a delay time far as much as possible until the electronic mails are actually transmitted.

Solution to Problem

In order to achieve the above object, an information processing device according to the present invention includes broadcast mail determination means configured to determine a broadcast mail among received electronic mails, broadcast mail reception predicted time limit setting means configured to, when a previously received electronic mail is determined as the broadcast mail, set a predicted time limit for receiving a broadcast mail based on the difference between the reception time of the previously received electronic mail and the reception time of the electronic mail determined as the broadcast mail, and broadcast mail reception standby end determination means configured to determine whether to end reception standby of the broadcast mail based on the predicted time limit for receiving the broadcast mail, which is set by the broadcast mail reception predicted time limit setting means.

Advantageous Effects of Invention

According to the present invention, it is possible to provide an information processing device which can combine electronic mails, the envelopes of which have been created for respective destinations, and control transmission by applying a rule thereto, without increasing a delay time as much as possible until the electronic mails are actually transmitted.

BRIEF DESCRIPTION OF DRAWINGS

FIG. 3 is an example of data retained in an e-mail information DB.

EXAMPLE EMBODIMENT

Preferred example embodiments of the present invention will be described in detail with reference to the drawings.

Outline of Example Embodiment

In the example embodiment of the present invention, e-mails divided into a plurality of pieces for each envelope destination in the process of delivery are able to be determined to be broadcast mail while the delivery delay time can be reduced. In the example embodiment of the present invention, the issue is solved by setting the reception standby time limit as follows.

1. As the time limit for standby for the broadcast mail, a broadcast mail reception predicted time limit that is dynamically set using a difference from the reception time of the e-mail determined as the broadcast mail before is used.

2. At a point of time when the e-mails addressed to all the e-mail addresses in a header To indicating the destination and a header Cc are received, the broadcast mail reception predicted time limit is set to the current time, and the standby of the mail is ended.

By setting such a reception standby time limit, it is possible to perform transmission control by managing the delay time until the electronic mail is actually transmitted without increasing the delay time as much as possible, combining the electronic mails whose envelopes are separately created for each destination, and applying the rule.

Figure 1:
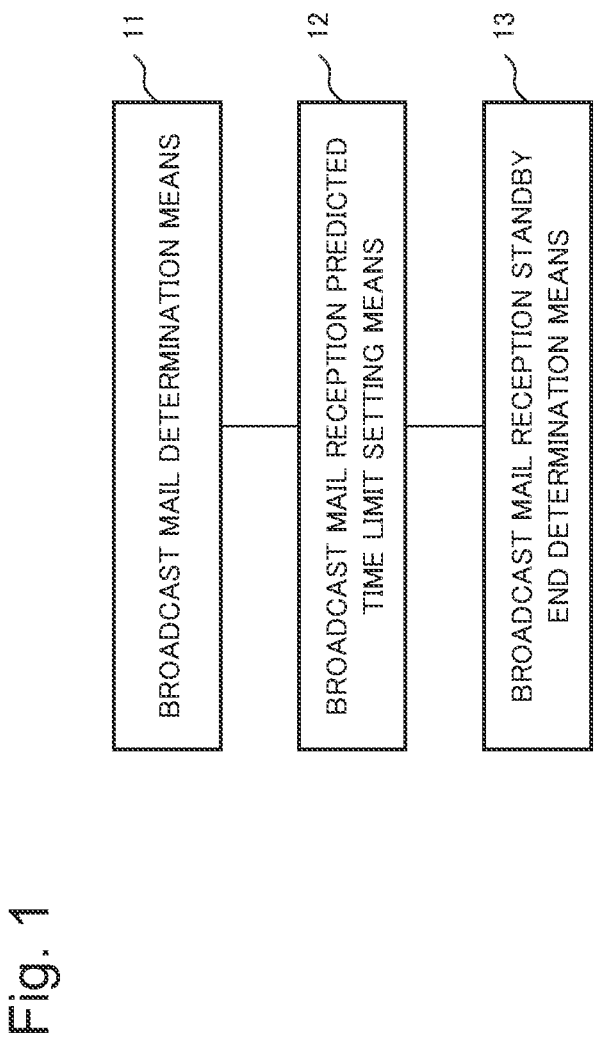
FIG. 1 is a block diagram for illustrating an information processing device according to an example embodiment of a superordinate concept of the present invention.

FIG. 1 is a block diagram for illustrating an information processing device according to an example embodiment of a superordinate concept of the present invention. The information processing device in FIG. 1 includes broadcast mail determination means 11, broadcast mail reception predicted time limit setting means 12, and broadcast mail reception standby end determination means 13.

The broadcast mail determination means 11 determines a broadcast mail from the received electronic mails. The determination of the broadcast mail can be performed, for example, by combining a specific header and a body of the electronic mail to generate data based on a predetermined rule and based on a consistency between the data items thus generated. The broadcast mail reception predicted time limit setting means 12 sets a predicted time limit for receiving the broadcast mail according to the determination result of the broadcast mail by the broadcast mail determination means 11. The predicted time limit for receiving the broadcast mail is dynamically set by using, for example, a time difference of electronic mail reception. In a case where the broadcast mail determination means 11 does not determine that the e-mail is the broadcast mail, the broadcast mail reception predicted time limit setting means 12 simply sets the predetermined time limit. The broadcast mail reception standby end determination means 13 determines whether to end the reception standby of the broadcast mail regarding the reception of the electronic mail based on the predicted time limit for receiving the broadcast mail set by the broadcast mail reception predicted time limit setting means 12.

In the information processing device of FIG. 1, the broadcast mail is determined from the received electronic mails, and it is determined whether to end reception standby of the broadcast mail by using a time difference of electronic mail reception. As a result, it is possible to combine and transmit the broadcast mail from the received electronic mails without increasing the delay time until the electronic mail is actually transmitted as much as possible. Hereinafter, a more specific example embodiment will be described.

First Example Embodiment

Figure 2:
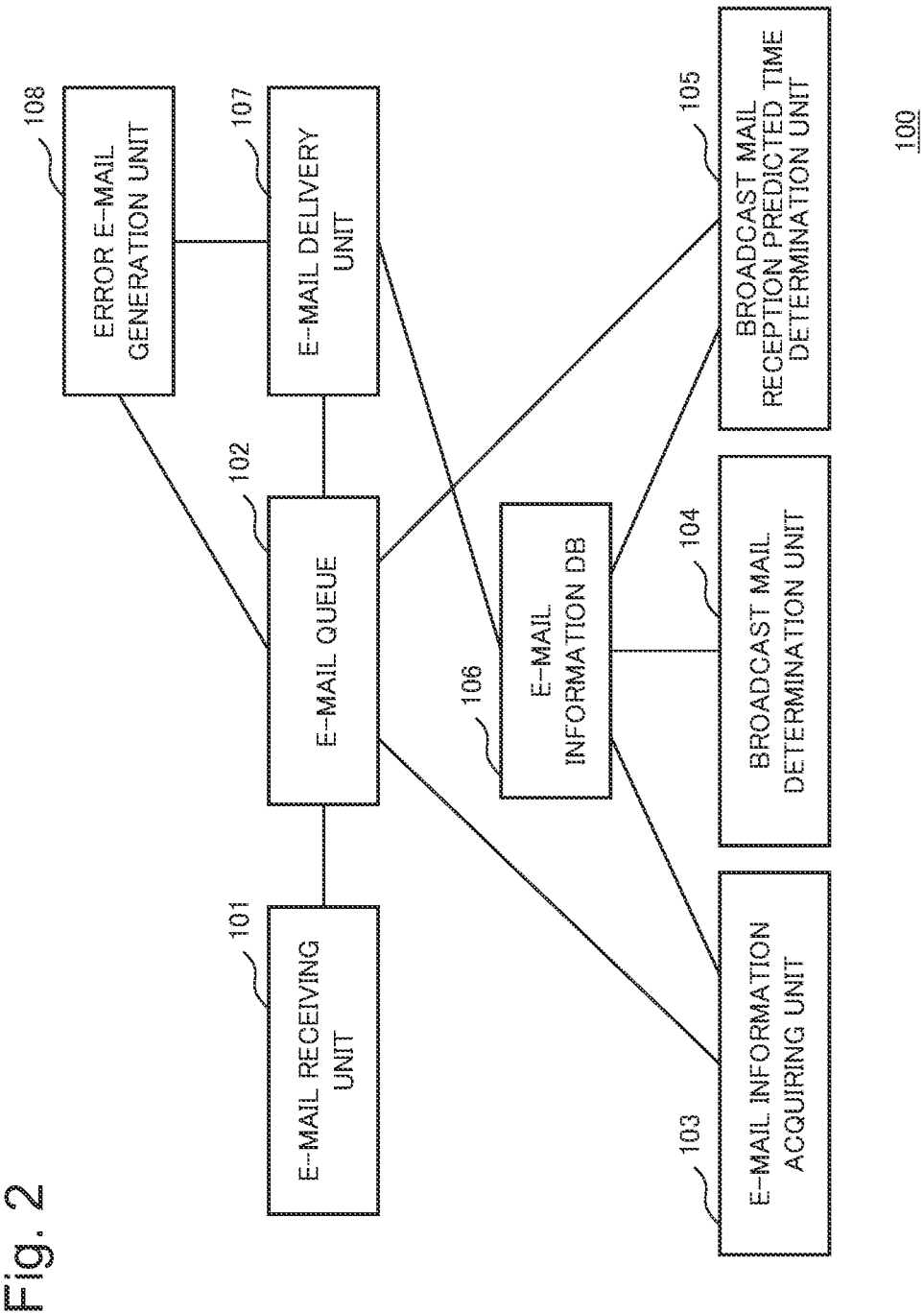
FIG. 2 is a block diagram for illustrating an information processing device according to a first example embodiment of the present invention.

An information processing device and a method for controlling an electronic mail according to a first example embodiment of the present invention will be described. FIG. 2 is a block diagram for illustrating an information processing device according to a first example embodiment of the present invention. The information processing device in FIG. 2 includes an e-mail receiving unit 101, an e-mail queue 102, an e-mail information acquiring unit 103, and a broadcast mail determination unit 104 as an example of the broadcast mail determination means. Furthermore, the information processing device in FIG. 2 includes a broadcast mail reception predicted time limit determination unit 105 as an example of the broadcast mail reception standby end determination means, an e-mail information database 106 (e-mail information DB 106), an e-mail delivery unit 107, an error e-mail generation unit 108, and the like.

The e-mail receiving unit 101 performs reception processing of an e-mail transmitted from the external mail server. The communication protocol with the external e-mail server is, for example, a Simple Mail Transfer Protocol (SMTP). The e-mail receiving unit 101 stores the information of the received e-mail in the e-mail queue 102. The e-mail queue 102 is a storage destination of the e-mail information received by the e-mail receiving unit 101. The e-mail receiving unit 101 retains envelope information and message information (header/body).

The e-mail information acquiring unit 103 acquires e-mail information necessary for broadcast mail determination from the envelope information and the message information stored in the e-mail queue 102. The e-mail information acquired by the e-mail information acquiring unit 103 is stored in the e-mail information DB 106.

The broadcast mail determination unit 104 determines the broadcast mail based on the e-mail information stored in the e-mail information DB 106, and stores the determination result and the standby time in the e-mail information DB 106.

Based on the e-mail information stored in the e-mail information DB 106, the broadcast mail reception predicted time limit determination unit 105 determines whether to end the standby of the broadcast mail, and stores the determination result in the e-mail information DB 106.

The e-mail information DB 106 is a database that stores e-mail information or a determination result used by the e-mail information acquiring unit 103, the broadcast mail determination unit 104, and the broadcast mail reception predicted time limit determination unit 105.

The e-mail delivery unit 107 delivers the e-mail in the e-mail queue 102 to an external e-mail transfer agent (MTA) based on the determination result stored in the e-mail information DB 106. Here, the communication protocol is SMTP.

In a case where a permanent error response is received when the e-mail delivery unit 107 has transmitted an e-mail to the external MTA, the error e-mail generation unit 108 generates an error e-mail to be transmitted to the transmission source. The error e-mail generated by the error e-mail generation unit 108 is stored in the e-mail queue 102.

(Specific Example of E-mail Information DB 106)

An example of e-mail information and a determination result stored in the e-mail information DB 106 will be described. FIG. 3 is a table for illustrating an example of e-mail information and a determination result stored in the e-mail information DB 106.

The table of the e-mail information DB 106 includes the e-mail information or determination results such as an e-mail identifier (e-mail ID) column, a reception date and time column, a broadcast mail determination hash value column, a To address column, a Cc address column, an Envelope-To address column, a broadcast mail determination column, a broadcast mail reception predicted time limit column, a remaining address column, and an end determination column for each received electronic mail. Here, each column indicates the following.

- E-mail ID: ID assigned to each received e-mail
- Reception date and time: time when the e-mail receiving unit 101 receives the e-mail
- Broadcast mail determination hash value: an md5 hash value (Message Digest algorithm 5 hash value) of a combination of a specific header and a body
- To address: address of header To
- Cc address: address of header Cc
- Envelope-To address: the address of the envelope destination
- Broadcast mail determination: e-mail ID determined as broadcast mail
- Broadcast mail reception predicted time limit: Time to end standby for broadcast mail
- Remaining address: Remaining address to end the standby for broadcast mail
- End determination: Determination result of the end of standby for broadcast mail FIG. 3 illustrates a state in which the reception date and time, the broadcast mail determination hash value, the To address, the Cc address, the Envelope-To address, the broadcast mail determination, the broadcast mail reception predicted time limit, the remaining address, and the end determination are retained in association with each other for the e-mail IDs 1101 to 1107.

Operation of Example Embodiment

Figure 4A:
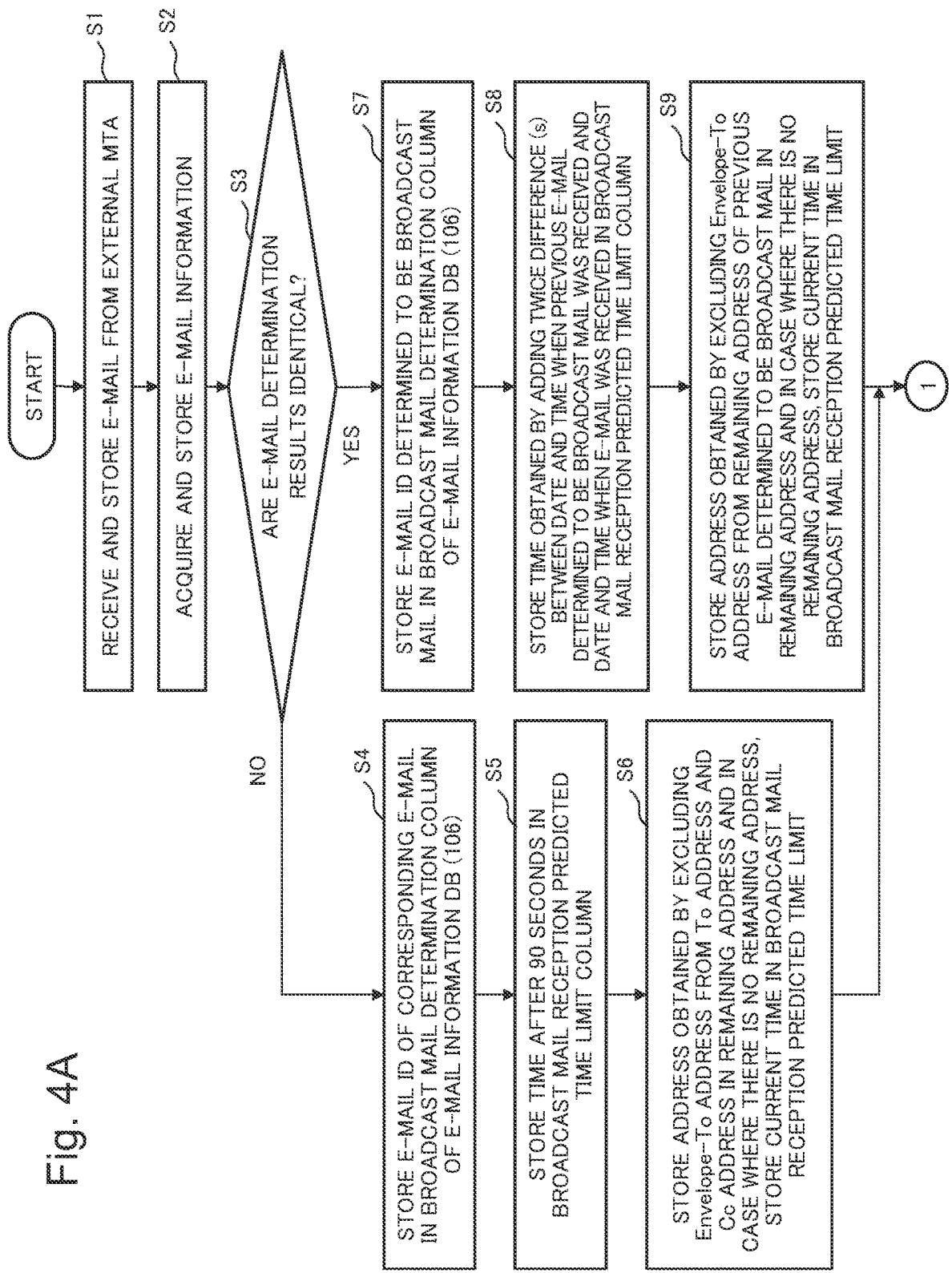
FIG. 4A is a flowchart for illustrating an operation of the information processing device according to the first example embodiment of the present invention.
Figure 4B:
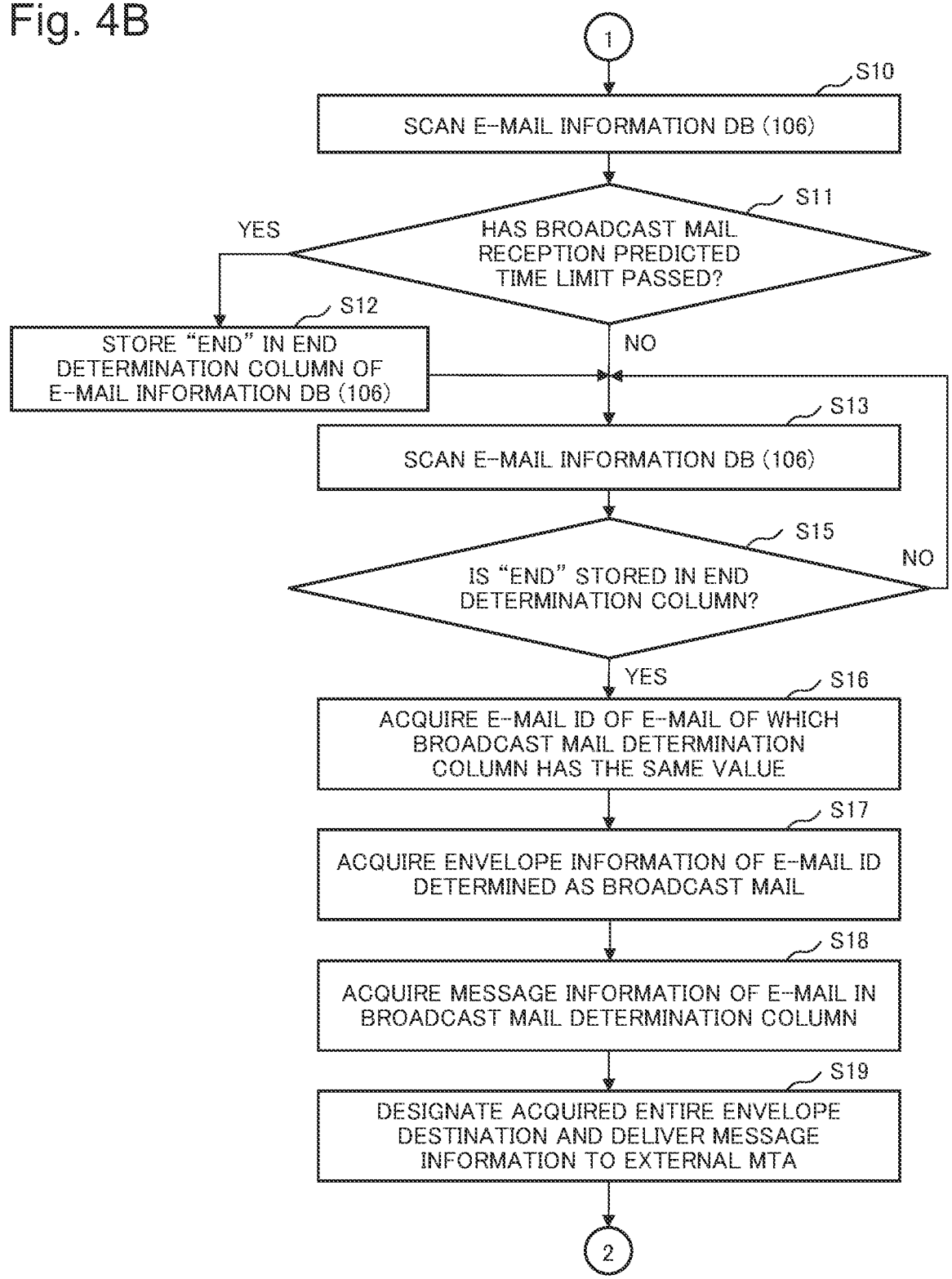
FIG. 4B is a flowchart for illustrating the operation of the information processing device according to the first example embodiment of the present invention.
Figure 4C:
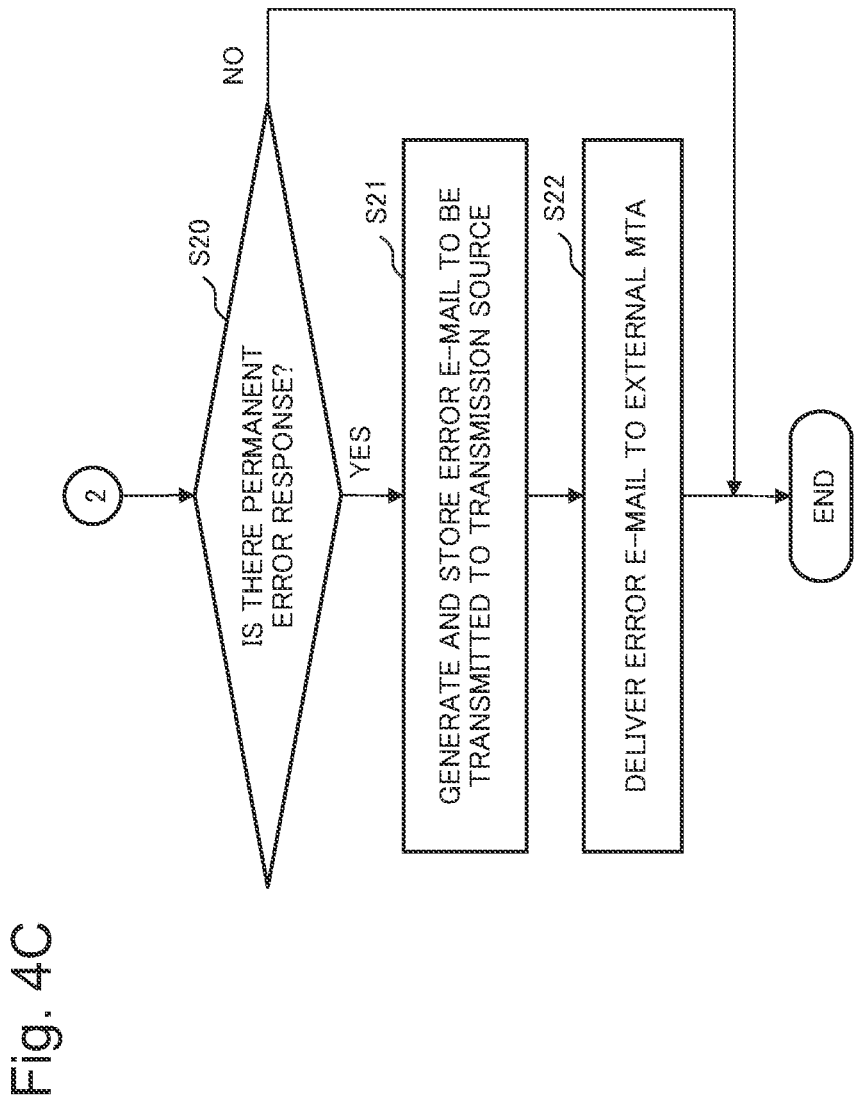
FIG. 4C is a flowchart for illustrating the operation of the information processing device according to the first example embodiment of the present invention.

Next, an operation of the information processing device according to the present example embodiment will be described with reference to a flowchart describing a control method. FIGS. 4A to 4C are flowcharts for illustrating an operation of the information processing device according to the present example embodiment, specifically, transmission control of a received electronic mail.

First, the e-mail receiving unit 101 of the information processing device illustrated in FIG. 2 receives an e-mail from the external MTA and stores the e-mail in the e-mail queue 102 (step S1). At this time, the information stored in the e-mail queue 102 is envelope information (address of sender, destination of To address, and Cc address) and message information (header and body) of the electronic mail.

Next, the e-mail information acquiring unit 103 acquires the e-mail information from the e-mail queue 102 and stores the e-mail information in the e-mail information DB 106 (step S2). Here, the e-mail information acquired by the e-mail information acquiring unit 103 includes six items of "e-mail ID", "reception date and time", "broadcast mail determination hash value", "To address", "Cc address", and "Envelope-To address".

Next, the broadcast mail determination unit 104 determines whether the received e-mails are identical (step S3). Here, an e-mail having the same broadcast mail determination hash value is determined to be the broadcast mail. The broadcast mail determination hash value is, for example, an md5 hash value configured by combining a specific header and a body of the received electronic mail.

In the e-mail information DB 106 illustrated in FIG. 2, the same value is stored in the broadcast mail determination hash value column of the e-mail ID: 1101, the e-mail ID: 1104, and the e-mail ID: 1105, and the same value is stored in the broadcast mail determination hash value column of the e-mail ID: 1103 and the e-mail ID: 1106. In the e-mail information DB 106 illustrated in FIG. 2, a value different from the broadcast mail determination hash value column of another e-mail ID is stored in the broadcast mail determination hash value column of the e-mail ID: 1102.

In a case where the e-mail determination results are not the same (No in step S3), the e-mail ID of the corresponding e-mail is stored in the broadcast mail determination column of the e-mail information DB 106 (step S4). Subsequent to step S4, for example, the time after 90 seconds is stored in the broadcast mail reception predicted time limit column of the e-mail information DB 106 (step S5). Subsequent to step S5, the address obtained by excluding the Envelope-To address from the To address and the Cc address is stored in the remaining address column (step S6). In step S6, in a case where there is no remaining address when the Envelope-To address is excluded from the To address and the Cc address, the current time is stored in the broadcast mail reception predicted time limit column of the e-mail information DB 106.

In a case where the e-mail determination results are the same (Yes in step S3), the e-mail ID determined to be the broadcast mail is stored in the broadcast mail determination column of the e-mail information DB 106 (step S7). In the e-mail information DB 106 illustrated in FIG. 2, "1101" of the e-mail ID determined to be the broadcast mail is stored in the broadcast mail determination column of the e-mail ID: 1104 and the e-mail ID: 1105. Further, "1103" of the e-mail ID determined as the broadcast mail is stored in the broadcast mail determination column of the e-mail ID: 1106. In a case where a value is already included in the broadcast mail determination column of the e-mail determined as the broadcast mail, the same value is stored.

Subsequent to step S7, a time obtained by adding twice the difference (seconds) between the reception date and time of the e-mail determined to be the broadcast mail and the corresponding e-mail to the current time is stored in the broadcast mail reception predicted time limit column of the e-mail information DB 106 (step S8). Subsequent to step S8, an address obtained by excluding the Envelope-To address from the remaining address of the previous e-mail determined to be the same is stored in the remaining address (step S9). In step S9, in a case where there is no remaining address when the Envelope-To address is excluded from the remaining addresses of previous e-mails determined to be the same, the current time is stored in the broadcast mail reception predicted time limit column of the e-mail information DB 106.

Subsequent to step S6 and step S9, the broadcast mail reception predicted time limit determination unit 105 scans the information stored in the e-mail information DB 106 (step S10) and determines the end of the broadcast mail standby.

In a case where the standby time of the e-mail information DB 106 has elapsed, it is determined that the process has ended. That is, in a case where the broadcast mail reception predicted time limit has passed (Yes in step S11), "END" is stored in the end determination column of the e-mail information DB 106 (step S12).

In a case where the standby time in the e-mail information DB 106 has not elapsed, that is, in a case where the broadcast mail reception predicted time limit has not elapsed (No in step S11), the broadcast mail reception predicted time limit determination unit 105 scans the information stored in the e-mail information DB 106 (step S13). In a case where "END" is not stored in the end determination column of the e-mail information DB 106 (No in step S15), the broadcast mail reception predicted time limit determination unit 105 continues scanning of the information stored in the e-mail information DB 106.

When "END" is stored in the end determination column of the e-mail information DB 106 (Yes in step S15), the e-mail delivery unit 107 acquires the e-mail ID of the electronic mail of which the broadcast mail determination column of the e-mail information DB 106 has the same value (step S16). Subsequent to step S16, the e-mail delivery unit 107 acquires the envelope information of the e-mail ID determined as the broadcast mail from the e-mail queue 102 (step S17). Subsequent to step S17, the e-mail delivery unit 107 acquires, from the e-mail queue 102, the message information of the e-mail of the e-mail ID in the broadcast mail determination column of the e-mail information DB 106 (step S18). Subsequent to step S18, the e-mail delivery unit 107 delivers the message information designating the acquired entire envelope destination to the external MTA (step S19).

In a case where the e-mail delivery is successful for all the destinations and there is no permanent error response (No in step S20), the process ends. When there is a permanent error response (Yes in step S20), the error e-mail generation unit 108 generates an error e-mail to be transmitted to the transmission source of the electronic mail, and stores the generated error e-mail in the e-mail queue 102 (step S21). Subsequent to step S21, the e-mail delivery unit 107 delivers the error e-mail to the external MTA (step S22).

Advantageous Effects of Example Embodiment

According to the information processing device and the method for controlling the electronic mail of the present example embodiment, a broadcast mail is determined from received electronic mails, and it is determined whether to end reception standby of the broadcast mail by using a difference in reception time of the electronic mail. Here, in the present example embodiment, as the time limit for standby for the broadcast mail, the broadcast mail reception predicted time limit is dynamically set using the difference from the reception time of the e-mail previously determined as the broadcast mail. As a result, it is possible to determine that the e-mail divided into a plurality of pieces for each envelope destination in the process of delivery is the broadcast mail while suppressing the delivery delay time.

In addition, in the present example embodiment, after the broadcast mail is determined from the received electronic mail, the standby of the broadcast mail is ended at a time point when the e-mail addressed to, for example, all the e-mail addresses in the header To or the header Cc indicating the destination of the electronic mail is received.

As a result, it is possible to combine and transmit the broadcast mail from the received electronic mails without increasing the delay time until the electronic mail is actually transmitted as much as possible. As a result, it is possible to reduce a case where it cannot be determined as a broadcast mail and to suppress the delivery delay time. In addition, it is possible to suppress the delivery delay time caused by standby unnecessarily even when the arrival of the broadcast mail is not expected.

As a result, regarding the electronic mail having the same content in which the same sender designates a plurality of destinations, such that the envelope is separately created for each destination, it is possible to transmit the electronic mail having the same content by the same sender to cover all the To addresses and Cc addresses without unnecessary delay.

In the information processing device and the method for controlling an electronic mail according to the present example embodiment, it is assumed that the electronic mail cannot be determined as the broadcast mail only in the following cases.

A case where an electronic mail to an envelope destination that is not in the To address and the Cc address is received after all the electronic mails addressed to the To address and the Cc address are received.

A case where a part of the electronic mail that has been envelope-divided into a plurality of electronic mails is received with an extreme delay (for example, in a case where the third electronic mail is received with a delay of the difference between the reception times of the first electronic mail and the second electronic mail×2 or more).

According to the present example embodiment, except for such a rare case, it is possible to determine that the e-mail is a broadcast mail, and it is possible to suppress a delivery delay time of an electronic mail of the same content in which the same sender designates a plurality of destinations.

Second Example Embodiment

Next, an information processing device and a method for controlling an electronic mail according to a second example embodiment of the present invention will be described. The present example embodiment relates to a response to a case where the received electronic mail is in the form of an e-mail list. The present example embodiment is achieved by the same configuration as the information processing device of the first example embodiment described above illustrated in FIG. 2, and is different from the information processing device of the first example embodiment in data written in the e-mail information DB 106 and determination processing using the data.

In the case of the e-mail list, the To address and the Cc address (the address of the e-mail list) do not exist in the envelope destination. In order to detect this state when the first electronic mail is received, the determination condition is added as follows.

In general, in the case of an e-mail list, the address of the e-mail list is designated as a reply destination address (Reply-To). By using this, in a case where the addresses of Reply-To and From are different, the end determination by the To address and the Cc address is not performed, and only the end determination by the standby time is performed. When the first electronic mail is received in this way, it is detected that the received electronic mail is in the form of the e-mail list.

As an operation of the present example embodiment, for example, a special value "@" is stored in the remaining address column of FIG. 3 in step S6 or step S9 of FIG. 4A described in the first example embodiment.

Advantageous Effects of Example Embodiment

According to the present example embodiment, similarly to the first example embodiment described above, it is possible to reduce a case where it cannot be determined as a broadcast mail and to suppress a delivery delay time.

Furthermore, according to the present example embodiment, when an electronic mail in the form of an e-mail list is received, the end determination by the standby time alone is performed without performing the end determination by the To address and the Cc address as described in the first example embodiment. As a result, it is possible to suppress the delivery delay time caused by extending the standby time.

Other Example Embodiment

Although the preferred example embodiments of the present invention have been described above, the present invention is not limited thereto. For example, the broadcast mail determination means 11, the broadcast mail reception predicted time limit setting means 12, and the broadcast mail reception standby end determination means 13 in FIG. 1 or the e-mail information acquiring unit 103, the broadcast mail determination unit 104, and the broadcast mail reception predicted time limit determination unit 105 in FIG. 2 can also be achieved by reading and executing an electronic mail processing program for achieving these functions in an information processing device having a central processing unit (CPU) and a memory.

In addition, such a program can be distributed in the form of a recording medium in which the program is recorded. This program can be distributed in a form of a general-purpose semiconductor recording device such as a Compact Flash (CF; registered trademark) and a Secure Digital (SD), a magnetic recording medium such as a flexible disk, an optical recording medium such as a Compact Disc Read Only Memory (CD-ROM), or the like. The present invention can be variously modified within the scope of the invention described in the claims, and it goes without saying that they are also included in the scope of the present invention.

Some of all of the above-described example embodiments may be described as in the following Supplementary Notes, but are not limited to the following.

(Supplementary Note 1) An information processing device including:
broadcast mail determination means configured to determine a broadcast mail among received electronic mails;
broadcast mail reception predicted time limit setting means configured to, when the previously received electronic mail is determined as the broadcast mail, set a predicted time limit for receiving a broadcast mail based on the difference between the reception time of the previously received electronic mail and the reception time of the electronic mail determined as the broadcast mail; and
broadcast mail reception standby end determination means configured to determine whether to end reception standby of the broadcast mail based on the predicted time limit for receiving the broadcast mail, which is set by the broadcast mail reception predicted time limit setting means.

(Supplementary Note 2) The information processing device according to Supplementary Note 1, in which
a time obtained by adding a predetermined multiple of the difference between the reception time of the previously received electronic mail and the reception time of the electronic mail determined to be the broadcast mail to a current time is set as the predicted time limit for receiving the broadcast mail.

(Supplementary Note 3) The information processing device according to Supplementary Note 1 or 2, in which
the reception standby of the broadcast mail is ended at a time point when the e-mails addressed to all the e-mail addresses in a To header and a Cc header indicating a destination of the received electronic mail are received.

(Supplementary Note 4) The information processing device according to Supplementary Note 3, in which
identification information of a previously received electronic mail, and an address of a difference between an address of an envelope destination and an address of the To header, and an address of the Cc header are retained in association with the electronic mail determined as the broadcast mail.

(Supplementary Note 5) The information processing device according to Supplementary Note 3, in which
identification information of a previously received electronic mail, and an address of a difference between an address of an envelope destination and an address of the To header, and an address of the Cc header are retained in association with the electronic mail determined as the broadcast mail,
the reception standby of the broadcast mail is ended based on the identification information of the previously received electronic mail, the address of the difference between the address of the envelope destination and the address of the To header, and the address of the Cc header, and
the electronic mail is send by specifying all the retrieved envelope destinations.

(Supplementary Note 6) The information processing device according to Supplementary Note 1, in which
when a transmission source address and a reply destination address of the received electronic mail are different, the broadcast mail reception predicted time limit setting means sets a predetermined time limit.

(Supplementary Note 7) The information processing device according to any one of Supplementary Notes 1 to 6, in which
data is generated based on a predetermined rule by combining a specific header and a body of the received electronic mail, and the broadcast mail determination means determines the broadcast mail based on a consistency between the data generated in this manner.

(Supplementary Note 8) A method for controlling an electronic mail, the method including:

determining a broadcast mail among received electronic mails;

setting, when the previously received electronic mail is determined as the broadcast mail, a predicted time limit for receiving a broadcast mail based on the difference between the reception time of the previously received electronic mail and the reception time of the electronic mail determined as the broadcast mail; and determining whether to end reception standby of the broadcast mail based on the set predicted time limit for receiving the broadcast mail.

(Supplementary Note 9) The method for controlling an electronic mail according to Supplementary Note 8, the method further including setting, as the predicted time limit for receiving the broadcast mail, a time obtained by adding a predetermined multiple of the difference between the reception time of the previously received electronic mail and the reception time of the electronic mail determined to be the broadcast mail to a current time.

(Supplementary Note 10) The method for controlling an electronic mail according to Supplementary Note 8 or 9, the method further including ending the reception standby of the broadcast mail at a time point when the e-mails addressed to all the e-mail addresses in a To header and a Cc header indicating a destination of the received electronic mail are received.

(Supplementary Note 11) The method for controlling an electronic mail according to Supplementary Note 10, the method further including retaining identification information of a previously received electronic mail, and an address of a difference between an address of an envelope destination and an address of the To header, and an address of the Cc header in association with the electronic mail determined as the broadcast mail.

(Supplementary Note 12) The method for controlling an electronic mail according to Supplementary Note 10, the method further including:

retaining identification information of a previously received electronic mail, and an address of a difference between an address of an envelope destination and an address of the To header, and an address of the Cc header in association with the electronic mail determined as the broadcast mail;

ending the reception standby of the broadcast mail based on the identification information of the previously received electronic mail, the address of the difference between the address of the envelope destination and the address of the To header, and the address of the Cc header; and sending the electronic mail by specifying all the retrieved envelope destinations.

(Supplementary Note 13) The method for controlling an electronic mail according to Supplementary Note 8, the method further including setting, when a transmission source address and a reply destination address of the received electronic mail are different, a predetermined time limit for electronic mail reception.

(Supplementary Note 14) The method for controlling an electronic mail according to any one of Supplementary Notes 8 to 13, the method further including generating data based on a predetermined rule by combining a specific header and a body of the received electronic mail, and determining the broadcast mail based on a consistency between the data generated in this manner.

(Supplementary Note 15) A program that causes a computer to function as:

broadcast mail determination means configured to determine a broadcast mail among received electronic mails;

broadcast mail reception predicted time limit setting means configured to, when the previously received electronic mail is determined as the broadcast mail, set a predicted time limit for receiving a broadcast mail based on the difference between the reception time of the previously received electronic mail and the reception time of the electronic mail determined as the broadcast mail; and broadcast mail reception standby end determination means configured to determine whether to end reception standby of the broadcast mail based on the predicted time limit for receiving the broadcast mail, which is set by the broadcast mail reception predicted time limit setting means.

(Supplementary Note 16) The program according to Supplementary Note 15, in which a time obtained by adding a predetermined multiple of the difference between the reception time of the previously received electronic mail and the reception time of the electronic mail determined to be the broadcast mail to a current time is set as the predicted time limit for receiving the broadcast mail.

(Supplementary Note 17) The program according to Supplementary Note 15 or 16, in which the reception standby of the broadcast mail is ended at a time point when the e-mails addressed to all the e-mail addresses in a To header and a Cc header indicating a destination of the received electronic mail are received.

(Supplementary Note 18) The program according to Supplementary Note 17, in which identification information of a previously received electronic mail, and an address of a difference between an address of an envelope destination and an address of the To header, and an address of the Cc header are retained in association with the electronic mail determined as the broadcast mail.

(Supplementary Note 19) The program according to Supplementary Note 17, in which identification information of a previously received electronic mail, and an address of a difference between an address of an envelope destination and an address of the To header, and an address of the Cc header are retained in association with the electronic mail determined as the broadcast mail, the reception standby of the broadcast mail is ended based on the identification information of the previously received electronic mail, the address of the difference between the address of the envelope destination and the address of the To header, and the address of the Cc header, and the electronic mail is send by specifying all the retrieved envelope destinations.

(Supplementary Note 20) The program according to Supplementary Note 15, in which when a transmission source address and a reply destination address of the received electronic mail are different, the broadcast mail reception predicted time limit setting means sets a predetermined time limit.

(Supplementary Note 21) The program according to any one of Supplementary Notes 15 to 20, in which data is generated based on a predetermined rule by combining a specific header and a body of the received electronic mail, and the broadcast mail determination means determines the broadcast mail based on a consistency between the data generated in this manner.

The present invention has been described above using the above-described example embodiments as exemplary examples. However, the present invention is not limited to the above-described example embodiments. That is, the present invention can apply various aspects that can be understood by those skilled in the art within the scope of the present invention.

This application is based upon and claims the benefit of priority from Japanese patent application No. 2019-237850, filed on Dec. 27, 2019, the disclosure of which is incorporated herein in its entirety by reference.

REFERENCE SIGNS LIST 101 e-mail receiving unit
102 e-mail queue
103 e-mail information acquiring unit
104 broadcast mail determination unit
105 broadcast mail reception predicted time limit determination unit
106 e-mail information DB
107 e-mail delivery unit
108 error e-mail generation unit

What is claimed is:

1. An information processing device comprising:
a processor; and
a memory storing instructions executable by the processor to:
determine that a received electronic mail is a broadcast mail;
when a previously received electronic mail was previously determined as a previous broadcast mail, set a predicted time limit for receiving a next broadcast mail based on a difference between a reception time of the previously received electronic mail and a reception time of the received electronic mail determined as the broadcast mail; and
determine whether to end reception standby of the next broadcast mail based on the predicted time limit, wherein
the reception standby of the next broadcast mail is ended at a time point when electronic mails addressed to all e-mail addresses in a To header and a Cc header indicating a destination of the received electronic mail are received.

2. The information processing device according to claim 1, wherein
identification information of the previously received electronic mail, and an address of a difference between an address of an envelope destination and an address of the To header, and an address of the Cc header are retained in association with the electronic mail determined as the broadcast mail.

3. The information processing device according to claim 1, wherein
identification information of the previously received electronic mail, and an address of a difference between an address of an envelope destination and an address of the To header, and an address of the Cc header are retained in association with the electronic mail determined as the broadcast mail, the reception standby of the next broadcast mail is ended based on the identification information of the previously received electronic mail, the address of the difference between the address of the envelope destination and the address of the To header, and the address of the Cc header, and the received electronic mail is sent by specifying the envelope destination.

4. The information processing device according to claim 3, wherein
when a transmission source address and a reply destination address of the received electronic mail are different, predetermined time limit is set.

5. The information processing device according to claim 3, wherein
data is generated based on a predetermined rule by combining a specific header and a body of the received electronic mail, and the whether the received electronic mail is the broadcast mail is determined based on a consistency between the data generated.

6. The information processing device according to claim 1, wherein
a time obtained by adding a predetermined multiple of the difference between the reception time of the previously received electronic mail and the reception time of the electronic mail determined to be the broadcast mail to a current time is set as the predicted time limit for receiving the next broadcast mail.

7. A method for controlling electronic mail, the method comprising:
determining, by a processor, that a received electronic mail is a broadcast mail;
setting, by the processor and when a previously received electronic mail was previously determined as a previous broadcast mail, a predicted time limit for receiving a next broadcast mail based on a difference between a reception time of the previously received electronic mail and a reception time of the received electronic mail determined as the broadcast mail;
determining whether to end reception standby of the next broadcast mail based on the predicted time limit; and
ending the reception standby of the next broadcast mail at a time point when electronic mails addressed to all e-mail addresses in a To header and a Cc header indicating a destination of the received electronic mail are received.

8. The method for controlling the electronic mail according to claim 7, further comprising
retaining identification information of the previously received electronic mail, and an address of a difference between an address of an envelope destination and an address of the To header, and an address of the Cc header in association with the electronic mail determined as the broadcast mail.

9. The method for controlling the electronic mail according to claim 7, further comprising:
retaining identification information of the previously received electronic mail, and an address of a difference between an address of an envelope destination and an address of the To header, and an address of the Cc header in association with the electronic mail determined as the broadcast mail;
ending the reception standby of the next broadcast mail based on the identification information of the previously received electronic mail, the address of the difference between the address of the envelope destination and the address of the To header, and the address of the Cc header; and sending the received electronic mail by specifying the envelope destination.

10. The method for controlling the electronic mail according to claim 7, further comprising setting, when a transmission source address and a reply destination address of the received electronic mail are different, a predetermined time limit.

11. The method for controlling the electronic mail according to claim 7, further comprising generating data based on a predetermined rule by combining a specific header and a body of the received electronic mail, and determining whether the received electronic mail is the broadcast mail based on a consistency between the data generated.

12. The method for controlling the electronic mail according to claim 7, the method further comprising setting, as the predicted time limit for receiving the next broadcast mail, a time obtained by adding a predetermined multiple of the difference between the reception time of the previously received electronic mail and the reception time of the electronic mail determined to be the broadcast mail to a current time.

13. A non-transitory computer-readable recording medium storing a program executable by a computer to:

determine that a received electronic mail is a broadcast mail;

when a previously received electronic mail was previously determined as a previous broadcast mail, set a predicted time limit for receiving a next broadcast mail based on a difference between a reception time of the previously received electronic mail and a reception time of the received electronic mail determined as the broadcast mail; and determine whether to end reception standby of the next broadcast mail based on the predicted time limit, wherein the reception standby of the next broadcast mail is ended at a time point when electronic mails addressed to all e-mail addresses in a To header and a Cc header indicating a destination of the received electronic mail are received.

14. The non-transitory computer-readable recording medium according to claim 13, wherein identification information of the previously received electronic mail, and an address of a difference between an address of an envelope destination and an address of the To header, and an address of the Cc header are retained in association with the electronic mail determined as the broadcast mail.

15. The non-transitory computer-readable recording medium according to claim 13, wherein identification information of the previously received electronic mail, and an address of a difference between an address of an envelope destination and an address of the To header, and an address of the Cc header are retained in association with the electronic mail determined as the broadcast mail, the reception standby of the next broadcast mail is ended based on the identification information of the previously received electronic mail, the address of the difference between the address of the envelope destination and the address of the To header, and the address of the Cc header, and the received electronic mail is sent by specifying the envelope destination.

16. The non-transitory computer-readable recording medium according to claim 13, wherein when a transmission source address and a reply destination address of the received electronic mail are different, a predetermined time limit is set.

17. The non-transitory computer-readable recording medium according to claim 13, wherein a time obtained by adding a predetermined multiple of the difference between the reception time of the previously received electronic mail and the reception time of the electronic mail determined to be the broadcast mail to a current time is set as the predicted time limit for receiving the next broadcast mail.

* * * * *